US010968389B1

(12) United States Patent
Cook et al.

(10) Patent No.: US 10,968,389 B1
(45) Date of Patent: Apr. 6, 2021

(54) ELECTRICALLY-PROCESSED LASER AND SCINTILLATOR MATERIALS

(71) Applicant: Government of the United States, as represented by the Secretary of the Air Force, Wright-Patterson AFB, OH (US)

(72) Inventors: Gary Cook, Beavercreek, OH (US); Ronald W. Stites, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 243 days.

(21) Appl. No.: 15/968,995

(22) Filed: May 2, 2018

Related U.S. Application Data

(60) Provisional application No. 62/500,564, filed on May 3, 2017.

(51) Int. Cl.
   *C30B 31/02* (2006.01)
   *C09K 11/88* (2006.01)
   *G01T 1/20* (2006.01)
   *H01S 3/16* (2006.01)

(52) U.S. Cl.
   CPC .............. *C09K 11/883* (2013.01); *G01T 1/20* (2013.01); *H01S 3/16* (2013.01)

(58) Field of Classification Search
   CPC .. C30B 1/00; C30B 1/02; C30B 30/02; C30B 31/02; C30B 31/12
   See application file for complete search history.

(56) References Cited

U.S. PATENT DOCUMENTS

2014/0203254 A1* 7/2014 Dorok ................ H01L 51/0512
257/40

FOREIGN PATENT DOCUMENTS

EP            0476347        *    8/1991

* cited by examiner

*Primary Examiner* — Robert M Kunemund
(74) *Attorney, Agent, or Firm* — AFMCLO/JAZ; Timothy Barlow

(57) ABSTRACT

A method of treating a substrate comprises applying an electric field to a substrate comprising a layer of a dopant on at least one surface; applying a predetermined temperature to the substrate in the electric field; applying the electric field and the predetermined temperature for a time sufficient to induce migration of the dopant into the substrate to provide a doped substrate; and removing the electric field and returning the doped substrate to about room temperature, wherein the doped substrate is characterized in that a spectral laser output of the doped substrate exhibits a nominally single frequency having a linewidth less than about 5 nm. The substrate may be a glass material, a single crystal material, a poly-crystalline material, a ceramic material, or a semiconductor material, which may be optically transparent. Before treatment, the substrate may be an undoped substrate or a doped substrate.

20 Claims, 14 Drawing Sheets

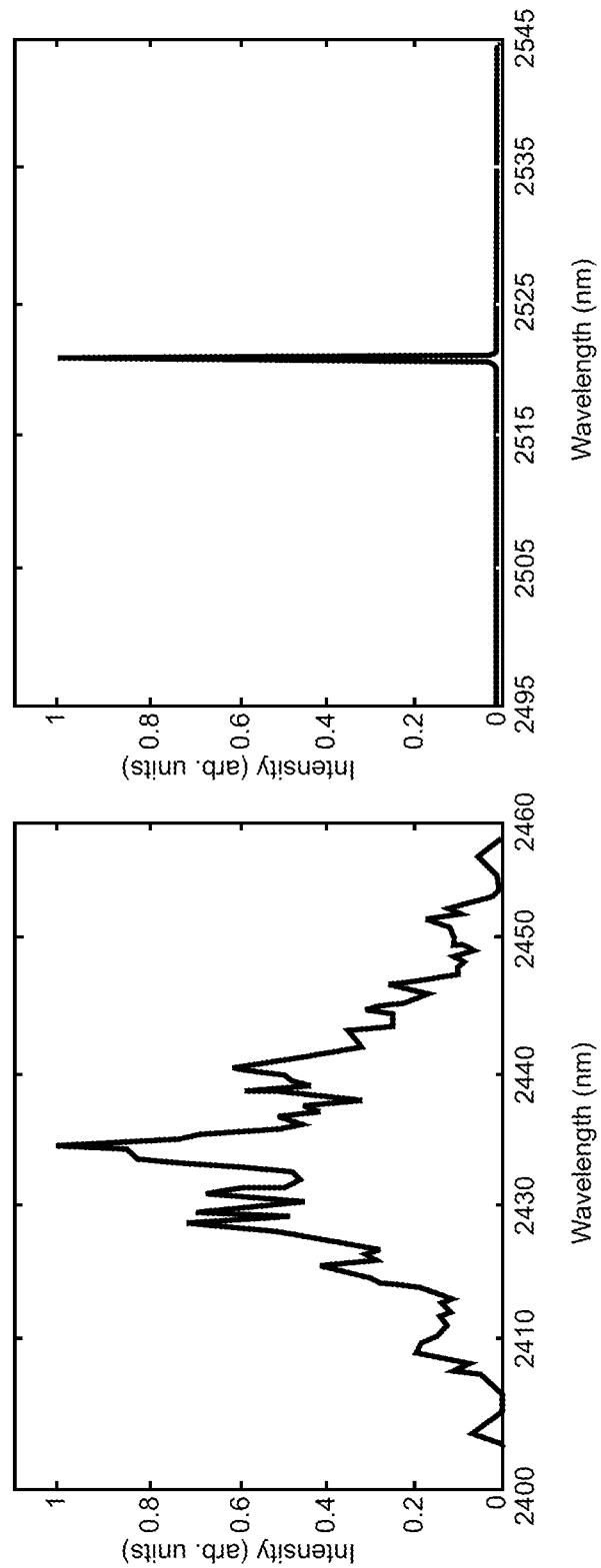

ELECTRICALLY-PROCESSED LASER AND SCINTILLATOR MATERIALS

Pursuant to 37 C.F.R. § 1.78(a)(4), this application claims the benefit of and priority to prior filed co-pending Provisional Application Ser. No. 62/500,564, filed 3 May 2017, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to laser and scintillator materials and, more particularly, to a method for processing such materials.

BACKGROUND OF THE INVENTION

Laser materials cover all known forms of physical materials, from gases to plasmas, from liquids to solids. Solid laser materials are very popular because they are relatively easy to engineer into laser devices, require no "containers" to hold the laser medium in place, and they can be produced with very high optical quality. In most cases solid laser materials comprise some kind of passive host material, such as a polymer, glass, or crystal, into which is added (or "doped") a quantity of active laser ions or laser compound. The laser dopant might comprise a molecular species such as an organic dye or chelate, but more commonly comprise atoms in the form of charged ions which are dispersed through the passive host. These ions may occupy the atomic site of one of the host constituent atoms (e.g. by substitution), or the ions may reside in between the resident host atoms as interstitial ions. Laser action occurs when externally applied (pump) energy, often in the form of an optical pulse, is absorbed by the ions and leads to a temporary increase in the ionic energy. Subsequent relaxation from this higher energetic state results in the liberation of a photon of characteristic frequency for the originating ionic species. Laser action results when this photon encourages subsequent photons to be liberated from adjacent ions, so that all of the emitted photons emerge with identical phase.

In all of these permutations, the role of the host material is primarily to hold the active ions fixed in space so they do not change their relative locations with respect to one another. This is to prevent deleterious effects on the laser properties to occur, such as concentration quenching or changes to the excited state lifetime of the laser ions. The host material must also be transparent throughout the intended operating wavelength range of the laser and pumping wavelengths. The host material, although passive, can affect the laser characteristics of the embedded active ions. The influence the host has on the active laser ions depends on the electronic structure of the laser ions. For example, rare earth ions, such as neodymium or ytterbium, have laser properties that are only slightly affected by the laser host. This is because the electrons which contribute to laser emission in these species are not the electrons in the outermost shell of the ions; the active laser electrons are deeper within the ions and are partially "shielded" by the outer electrons. The host electrons therefore are unable to perturb the behavior of the deeper laser-related electrons in rare earth materials, which results in the observed insensitivity to the host. However, the same is not true for other laser ions, such as transition metals.

Transition metal lasers have become very popular as a source of efficient, tunable, mid infrared laser light. But unlike rare earths, transition metal ions have a laser-related electronic structure which occurs in the outermost layers of the ion. This makes transition metals extremely sensitive to their environment. This sensitivity is what leads to the extraordinary tunability of transition metal lasers, where the host material changes the excitation and relaxation properties of the embedded laser ion.

While a passive host can have a profound impact on the embedded active laser material, the same is often true in reverse, i.e. the addition of active laser ions can change the physical properties of the passive host. Many of the best solid state laser materials are crystals. Crystals provide optical and thermal advantages over glasses and polymers, but crystal growth is very sensitive to the presence of impurities. The added laser ion dopants act as impurities and can adversely affect, or even prevent, crystal formation with conventional methods such as Czochralski growth, top-seeded solution growth, Bridgman growth, etc. This places severe limitations on the obtainable concentrations of active ions that can be applied to many laser hosts. For these reasons, post-growth thermal diffusion of active ions is sometimes used as an alternative method for introducing a dopant species into an already established solid host.

A primary example of this technique is the current industry-standard method of fabricating transition metal doped II-VI crystals, such as Cr:ZnSe and Fe:ZnSe. The standard (prior art) method takes polished polycrystalline samples of ZnSe (for example) onto which a thin layer of metallic dopant (e.g. 100 nm-1000 nm Cr or Fe) is deposited using standard evaporation or sputtering techniques. The metal-coated crystal is then sealed into a quartz tube, usually under vacuum, and then heated (typically 900° C.-1100° C.) for a prolonged period until sufficient thermal diffusion of the deposited metal layer into the crystal substrate has taken place.

The process of thermal diffusion takes a considerable length of time, often requiring many weeks of high temperature exposure. Some attempts have been made to accelerate the process by applying intense gamma radiation to the system to enhance the diffusion rate of ions, but this has yielded only a modest improvement in the processing times. In all cases, conservation of electrical charge is required. Hence, unless the diffusion process is interstitial in nature (which may permit neutral metallic ions to be implanted), substitution of the host ions with the dopant results in an ionic exchange with host ions. This gradually replaces the external metal layer with a layer comprising neutralized host ions. For example, with Cr:ZnSe, Cr metal ions are taken up as $Cr^{2+}$ ions by the host, while $Zn^{2+}$ ions are liberated and converted to Zn metal through capture of the two electrons from the incoming Cr ions. Zinc metal therefore forms in place of the Cr ions at the surface of the crystal. This process continues (providing there is sufficient thermal exposure time) until an equilibrium is established between the relative concentrations of the Cr and Zn ions within, and surrounding, the crystal.

After processing, the thermal diffusion-treated crystal requires re-polishing to remove the excess Zn/Cr metal and, due to the low pressure and high temperatures employed, surface damage is common through partial evaporation of the applied metal layer and of the substrate. The length of time required for conventional thermal diffusion, together with the extensive re-processing, makes crystals made by this technique expensive and difficult to obtain reproducibly. Often a larger sample must be "mined" to locate regions approximating the required doping concentration, adding further to the overall cost.

In contrast to high-temperature thermal diffusion of Cr ions into ZnSe, for example, which produces inhomogeneously-broadened material only, Hot Isostatic Pressing (HIP) may be used to create homogeneously-broadened material, i.e. material characterized by a very narrowed linewidth when used as a laser material, and HIP may be even be used to convert commercial grade materials into homogeneously-broadened materials. In addition, HIP may also be used to diffuse active laser ions into a crystalline host. Hot Isostatic Pressing may be used as a means for diffusing active laser or scintillator ions into crystalline or glass hosts. The HIP process may also be used for post-production treatment of commercial materials to create similar or identical optical and laser effects. In both cases, whether the dopant is introduced directly as part of the HIP process, or if the dopant is already present in the starting materials, i.e. for commercial materials, the HIP treatment dramatically changes the spectral-broadening characteristics of the resulting crystal. This is especially pronounced for the case of transition metal-doped chalcogenide crystals, such as Cr:ZnSe and Fe:ZnSe. FIGS. 1A-1B illustrate the spectral-broadening characteristics in a comparison of standard laser emissions from a commercial (non-HIP) Cr:ZnSe crystal (FIG. 1A) with that from the same crystal, in the same laser resonator, under identical pumping conditions, but after having been HIP treated (FIG. 1B). The dramatic reduction in the free-running laser linewidth, from around 2.4 THz to less than 900 MHz, represents more than three orders of magnitude increase in the spectral brightness of the laser, without sacrificing the laser's efficiency or tunability. This is a highly attractive feature for most laser applications and is especially attractive whenever the laser output is required to drive nonlinear optical processes, such as parametric frequency conversion.

The inference taken from the HIP-treated laser material tests is that HIP treatment removes atomic defects from the laser crystal, changing the emission properties from inhomogeneously-broadened to homogeneously-broadened. The homogeneously-broadened state enables all of the active laser ions to experience identical local crystal fields and to therefore be able to collectively contribute to the same gain spectrum. Under these circumstances gain narrowing under stimulated emission causes the laser linewidth to progressively narrow for each optical pass through the laser crystal. HIP treatment of laser crystals is therefore very important for transition metal chalcogenide lasers in particular, and also for solid state laser materials in general. However, access to large and bulky HIP chambers is a pre-requisite for this type of material processing, and which may not be readily available.

In view of the foregoing, new methods are needed to make improved doped or alloyed materials that are suitable for use in various applications, such as lasers.

SUMMARY OF THE INVENTION

The present invention overcomes the foregoing problems and other shortcomings, drawbacks, and challenges of producing laser and scintillator materials having narrowed linewidth without relying on a high-pressure process, with or without elevated temperatures. The present invention provides an alternative method for achieving the same results without needing the HIP process. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the invention, a method of treating a substrate comprises: (a) applying an electric field to a substrate comprising a layer of a dopant on at least one surface; (b) applying a predetermined temperature to the substrate in the electric field; (c) applying the electric field and the predetermined temperature for a time sufficient to induce migration of the dopant into the substrate to provide a doped substrate; and (d) removing the electric field and returning the doped substrate to about room temperature, wherein the doped substrate is characterized in that a spectral laser output of the doped substrate exhibits a nominally single frequency having a linewidth less than about 5 nm.

The substrate may be a glass material, a single crystal material, a poly-crystalline material, a ceramic material, or a semiconductor material. The substrate, before treatment commences, may comprise an undoped substrate or a doped substrate. For clarity, an "undoped" substrate may have some impurities but the amount and distribution of the impurities is not sufficient to affect the spectral characteristics in the manner disclosed herein. Alternatively, a "doped" substrate will have efficacious amounts of a dopant applied to a surface, or included within the substrate, but the amount and/or distribution of the dopant will not be sufficient to affect the spectral characteristics in the manner disclosed herein.

According to a first variation, the substrate is optically transparent.

According to another variation, the dopant comprises one or more transition metals, one or more rare earth elements, or a combination of both.

According to a further variation, the metallic dopant is an atomic or ionic species of an element selected from the group consisting of silver, gold, cobalt, chromium, copper, iridium, iron, manganese, molybdenum, niobium, nickel, palladium, platinum, rhenium, rhodium, ruthenium, tantalum, hafnium, osmium, titanium, vanadium, tungsten, zirconium, scandium, yttrium, lanthanum, cerium, praseodymium, neodymium, samarium, europium, gadolinium, terbium, dysprosium, holmium, erbium, thulium, ytterbium, lutetium, or combinations thereof.

According to another variation, the layer of a dopant applied to a surface of the substrate comprises one or more segregated layers of distinct chemical species, a plurality of blended dopant materials, or a plurality of dopant materials as a eutectic.

According to a further variation, the substrate is selected from the group consisting of Zinc selenide (ZnSe), Zinc Sulphide (ZnS), Yttrium Aluminum Garnet (YAG), Yttrium Lithium Fluoride (YLF), Yttrium orthovanadate (Nd:YVO$_4$), Neodymium doped yttrium calcium oxoborate Nd:YCa$_4$O(BO$_3$)$_3$, silicate glass, phosphate glass, sapphire, lithium strontium (or calcium) aluminum fluoride (Ce:LiSAF, Ce:LiCAF), chrysoberyl (alexandrite), calcium fluoride (CaF$_2$), Gallium Nitride (GaN), Gallium Phosphide (GaP), Indium Gallium Nitride (InGaN), Aluminum Gallium Indium Nitride (InGaInP), Aluminum Gallium Arsenide Phosphide (InGaAsP), Lithium niobate (LiNbO$_3$), Potassium Niobate (KNbO$_3$), Strontium Barium Niobate (SBN), Yttrium Scandium Gallium Garnet (YSGG), Yttrium Vanadate (YVO$_4$), Terbium Gallium Garnet (Tb$_3$Ga$_5$O$_{12}$), Potassium Gadolinium Tungstate (KGW), Forsterite (Mg$_2$SiO$_4$), Barium Yttrium Fluoride (BaY$_2$F$_5$), Barium Yttrium Lutetium Fluoride (BaYLuF$_5$), and combinations thereof.

According to another variation, the predetermined temperature is between about −30° C. to about 1000° C.

According to a further variation, the applied electric field degree is between about 100 V/cm to about 10 kV/cm.

According to another variation, the time sufficient to induce migration of the dopant into the substrate is between about 1 hour to about 1,000 hours.

According to a further variation, the substrate is ZnSe or ZnS, and the dopant is chromium or iron.

According to another variation, a thickness of the layer of dopant is within a range from about 60 Å to about 60,000 Å.

According to a further variation, the electric field and temperature are applied in an inert atmosphere.

According to another variation, heating the substrate and applying the degree of isostatic external pressure is performed in an atmosphere comprising Argon, Nitrogen, Oxygen, Carbon Dioxide, Neon, Helium, Hydrogen, or combinations thereof.

According to a further variation, the dopant comprises a non-metallic element or compound.

According to another variation, the substrate is selected from the group consisting of Zinc Selenide, Zinc Sulfide, Zinc Telluride, Cadmium selenide, Cadmium sulfide, Cadmium Telluride, or Mercury Cadmium Telluride; and the dopant is Sulfur, Tellurium, or a combination of both.

According to a second embodiment of the invention, a doped treated substrate comprises a substrate comprising at least one of a glass material, a single crystal material, a poly-crystalline material, a ceramic material, or a semiconductor material; and a dopant comprising one or more transition metals, one or more rare earth elements, or a combination of both, the doped substrate characterized in that a spectral laser output of the doped substrate exhibits a nominally single frequency having a linewidth less than about 5 nm.

According to a first variation, a spectral laser output of the doped substrate is characterized by a nominally single frequency having a linewidth less than about 1 nm.

According to a further variation, a spectral laser output of the doped substrate is characterized by a nominally single frequency having a linewidth less than about 140 pm.

According to another variation, the dopant comprises a non-metallic element or compound.

According to a further variation, the substrate is selected from the group consisting of Zinc Selenide, Zinc Sulfide, Zinc Telluride, Cadmium selenide, Cadmium sulfide, Cadmium Telluride, or Mercury Cadmium Telluride; and the dopant is Sulfur, Tellurium, or a combination of both.

According to a third embodiment of the invention, a method of forming an alloy material comprises (a) applying an electric field to a substrate comprising a layer of an alloying agent on at least one surface of the substrate; (b) applying a predetermined temperature to the substrate in the electric field for a time sufficient to induce migration of the alloying agent into the substrate to provide the alloy material; and (c) removing the electric field and returning the alloy material to room temperature.

According to a fourth embodiment of the invention, a method of treating a substrate comprises (a) applying an electric field to an undoped substrate; (b) applying a predetermined temperature to the substrate in the electric field; (c) applying the electric field and the predetermined temperature for a predetermined time sufficient to produce desired spectral characteristics of the substrate; and (d) removing the electric field and returning the undoped substrate to about room temperature, wherein the undoped substrate is characterized in that a spectral laser output of the undoped substrate exhibits a nominally single frequency having a linewidth less than about 5 nm. The linewidth may be less than about 1 nm, or even less than about 140 pm.

According to a first variation, the undoped substrate is a glass material, a single crystal material, a poly-crystalline material, a ceramic material, or a semiconductor material.

According to a further variation, the substrate is optically transparent.

According to a fifth embodiment of the invention, a treated substrate comprises a substrate comprising at least one of a glass material, a single crystal material, a poly-crystalline material, a ceramic material, or a semiconductor material, the substrate characterized in that a spectral laser output of the doped substrate exhibits a nominally single frequency having a linewidth less than about 5 nm.

According to a first variation, a spectral laser output of the substrate is characterized by a nominally single frequency having a linewidth less than about 1 nm.

According to a further variation, a spectral laser output of the substrate is characterized by a nominally single frequency having a linewidth less than about 140 pm.

According to a sixth embodiment of the invention, a method of treating a substrate comprises (a) applying a first electric field to a substrate comprising a layer of a first dopant on at least one surface; (b) applying a first predetermined temperature to the substrate in the electric field; (c) applying the first electric field and the first predetermined temperature for a first time period sufficient to induce migration of the first dopant into the substrate to provide a first dopant layer in a doped substrate; and (d) removing the electric field and returning the doped substrate to about room temperature.

According to a first variation, the method further comprises (e) applying a layer of a second dopant to the at least one surface of the doped substrate; (0 applying a second electric field to the doped substrate; (g) applying a second predetermined temperature to the doped substrate in the second electric field; (h) applying the second electric field and the second predetermined temperature for a second time period sufficient to induce migration of the second dopant into the doped substrate to provide a second dopant layer adjacent the first dopant layer in the doped substrate; and (i) removing the electric field and returning the doped substrate to about room temperature.

According to another variation, substrate is a glass material, a single crystal material, a poly-crystalline material, a ceramic material, or a semiconductor material.

According to a further variation, the substrate is optically transparent.

According to another variation, the dopants comprise one or more transition metals, one or more rare earth elements, or a combination of both.

According to a further variation, the metallic dopants are an atomic or ionic species of an element selected from the group consisting of silver, gold, cobalt, chromium, copper, iridium, iron, manganese, molybdenum, niobium, nickel, palladium, platinum, rhenium, rhodium, ruthenium, tantalum, hafnium, osmium, titanium, vanadium, tungsten, zirconium, scandium, yttrium, lanthanum, cerium, praseodymium, neodymium, samarium, europium, gadolinium, terbium, dysprosium, holmium, erbium, thulium, ytterbium, lutetium, or combinations thereof.

According to another variation, the layer of the first dopant comprises one or more segregated layers of distinct chemical species, a plurality of blended dopant materials, or a plurality of dopant materials as a eutectic.

According to a further variation, the substrate is selected from the group consisting of Zinc selenide (ZnSe), Zinc Sulphide (ZnS), Yttrium Aluminum Garnet (YAG), Yttrium Lithium Fluoride (YLF), Yttrium orthovanadate (Nd: $YVO_4$), Neodymium doped yttrium calcium oxoborate Nd:$YCa_4O(BO_3)_3$, silicate glass, phosphate glass, sapphire, lithium strontium (or calcium) aluminum fluoride (Ce: LiSAF, Ce:LiCAF), chrysoberyl (alexandrite), calcium fluoride ($CaF_2$), Gallium Nitride (GaN), Gallium Phosphide (GaP), Indium Gallium Nitride (InGaN), Aluminum Gallium Indium Nitride (InGaInP), Aluminum Gallium Arsenide Phosphide (InGaAsP), Lithium niobate ($LiNbO_3$), Potassium Niobate ($KNbO_3$), Strontium Barium Niobate (SBN), Yttrium Scandium Gallium Garnet (YSGG), Yttrium Vanadate ($YVO_4$), Terbium Gallium Garnet ($Tb_3Ga_5O_{12}$), Potassium Gadolinium Tungstate (KGW), Forsterite ($Mg_2SiO_4$), Barium Yttrium Fluoride ($BaY_2F_5$), Barium Yttrium Lutetium Fluoride ($BaYLuF_5$), and combinations thereof.

According to another variation, the first and second predetermined temperatures are between about –30° C. to about 1000° C.

According to a further variation, the first and second applied electric fields are between about 100 V/cm to about 10 kV/cm.

According to another variation, the time sufficient to induce migration of the first and second dopant into the substrate is between about 1 hour to about 1,000 hours.

According to a further variation, the substrate is ZnSe or ZnS, and the dopant is chromium or iron.

According to another variation, a thickness of each of the first and second layers of dopants is within a range from about 60 Å to about 60,000 Å.

According to a further variation, the first and second electric fields and temperatures are applied in an inert atmosphere.

According to another variation, heating the substrate and applying the degree of isostatic external pressure is performed in an atmosphere comprising Argon, Nitrogen, Oxygen, Carbon Dioxide, Neon, Helium, Hydrogen, or combinations thereof.

According to a further variation, the first and second dopants comprise a non-metallic element or compound.

According to another variation, the substrate is selected from the group consisting of Zinc Selenide, Zinc Sulfide, Zinc Telluride, Cadmium Selenide, Cadmium Sulfide, Cadmium Telluride, or Mercury Cadmium Telluride; and the dopant is Sulfur, Tellurium, or a combination of both.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 1A-1B illustrate laser emission spectra from a standard commercial Cr:ZnSe laser crystal (FIG. 1A) and from the same laser and crystal after HIP treatment (FIG. 1B), with identical output laser power, according to the prior art;

Figures 2A, 2B:
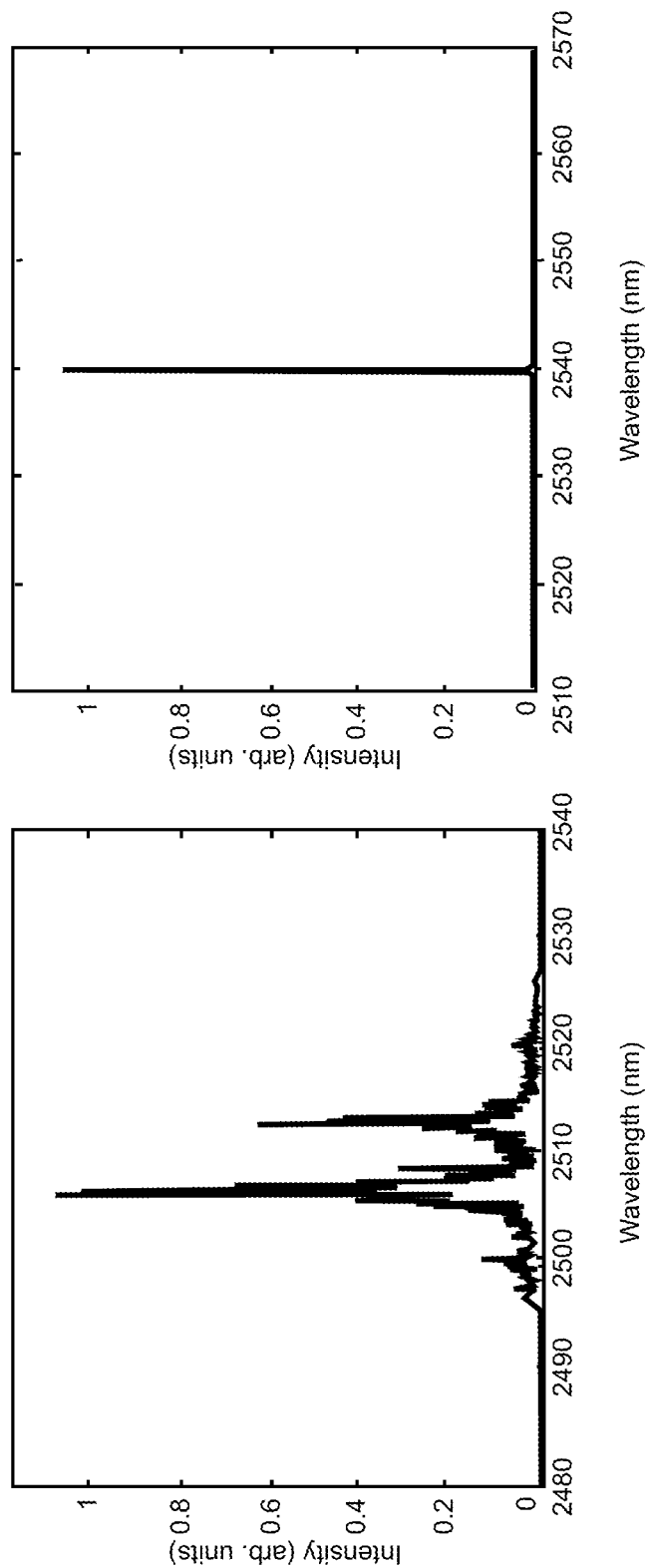
FIGS. 2A-2B illustrate laser emission spectra from a standard commercial Cr:ZnSe laser crystal (FIG. 2A) and from the same laser and crystal after electrical treatment (FIG. 2B), with identical output laser power, according to an embodiment of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

This disclosed invention describes a method for dramatically improving the properties of doped solid optical materials. The method is particularly appropriate for covalently-bonded laser materials and scintillator materials, e.g. Cr:ZnSe, but the method may be applied to a wide variety of optical materials. The same method could also be used to create alloyed optical materials and/or graded doping/alloys which may be difficult or not possible to be produced by other means. This invention achieves the same laser properties, narrowed linewidth (homogeneously-broadened) as those materials treated by the Hot Isostatic Pressing (HIP) process, but utilizes an entirely different approach.

In response to the somewhat restrictive demands of the HIP process, the present invention describes an entirely different electrical approach to achieving the same inhomogeneous to homogeneous broadening conversion in laser materials. The invention has been demonstrated with Cr:ZnSe and is broadly applicable to many different laser and scintillator materials.

As described above, it is assumed that the observed laser line-narrowing resulting from HIP treatment is due to the removal of defects in the crystal substrate. All bulk crystalline materials must exist in a charge neutral state, otherwise the crystal would be permanently charged to some arbitrarily high voltage. Local crystalline defects, such as vacancies, interstitialities, substitutions, and dislocations have charges associated with them. Since the net charge state of the whole crystal must be zero, the charges associated with the crystal defects must be self-compensating; there exists an equal total of positive defect charges and negative defect charges. The inventive step, in realizing this, has been to propose the use of an externally-applied electric field to migrate the charge-associated defects out of the crystal. The application of a modest temperature may assists this process by "loosening up the bonds" so that charge migration under a given field strength may occur more easily.

This process has been tested and verified at ~250° C. with an applied field strength of approximately 5 kV/cm applied over a period of about 1 week. For verification, a commercial Cr:ZnSe crystal (acquired from IPG Photonics) was subjected to the temperature cycle according to this process, but without the application of an electric field. Temperatures in the 200° C. to 250° C. range have been applied with success; electrical conductivity of the materials is often temperature dependent. Cr:ZnSe is such a temperature dependent material, and 240-250° C. may be an optimal range for processing this material according to the disclosed method. Other crystals may require higher or lower temperatures to achieve similar results. The effect of the temperature seems to be in providing ease of movement of ions or defects in the presence of a given electric field. It may be possible to achieve the same effect at lower temperatures if the electric field is ramped up to much higher values, although this may require the use of a dielectric oil or gas to prevent arcing around the sample. An advantage of this method is that the atmospheric pressure does not need to be controlled in the manner of the HIP process. The disclosed process may be accomplished at atmospheric pressure (or vacuum) with or without a particular background gas (or air) to prevent or promote oxidation or reduction. In addition, an electric field may be used to enhance the use of HIP. The spectroscopic and laser characteristics of this crystal were compared before and after heating and found to be identical. This test confirmed that the temperature cycling alone did not directly contribute to any of the later observations made after the application of an electric field. The same crystal was then subjected to an identical thermal cycle, but with the external electric field now applied for the full duration of the test.

The free-lasing laser characteristics of this crystal are compared in FIGS. 2A-2B for pre-electrical treatment (FIG. 2A) and post-electrical treatment (FIG. 2B), with the measurements taken in the same laser resonator under the same pumping conditions. It is clear that dramatic line-narrowing has occurred, with narrowed linewidth characteristics (FIG. 2B) very similar, or better, than the HIP data illustrated in FIG. 1B, even though the electrical treatment was done at atmospheric pressure (under nitrogen gas) and at a much lower temperature.

Note that both the HIP-treated and the electrically-treated versions have generated a significant red-shift in their spectral positions with respect to their pre-treatment positions. A red shift is a common feature for increased ion concentration in these materials. In both cases the red shift is attributed to an increase in the effective Cr ion concentration in the crystals. Although the total Cr ion concentration has not changed, all of the ions are now available and able to contribute to the same emission spectrum; hence, the effective concentration within the gain spectrum has increased for the stimulated emission process. Apart from the increased convenience and lower cost compared with HIP treatment, the electrical treatment process offers a further advantage. The electrical characteristics of the Cr:ZnSe crystal change with time such that a "signature" of conversion from non-Ohmic (curved—blue circles) to Ohmic (linear—red squares) response occurs when the crystal has been fully converted to a homogeneously-broadened material.

Figure 3:
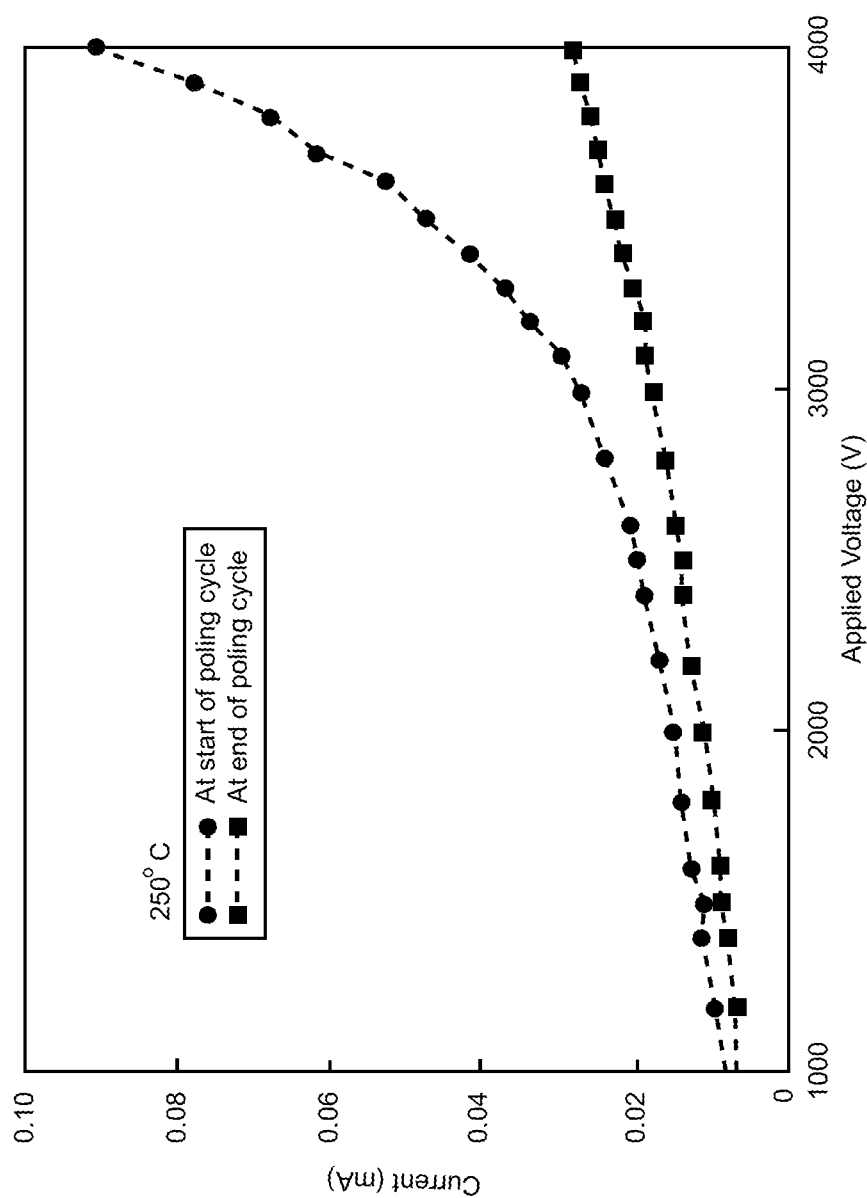
FIG. 3 illustrates Current vs Voltage characteristics for pre- and post-electrical treatment of a Cr:ZnSe, according to an embodiment of the invention.

FIG. 3 illustrates this signature in the V-I characteristics for the crystal processed in FIGS. 2A-2B. For the data shown in FIG. 3, the poling cycle comprised heating the crystal to about 250° C. with a ramp rate of around 100° C. per hour. The crystal was then held at about 250° C. for 7 days and then cooled to room temperature with a ramp rate of about 100° C. per hour. Silver paint was applied to two opposite faces of the crystal to ensure good Ohmic contact; the faces exhibit polycrystalline and cubic morphology, so it didn't matter which pair of faces were used. An electrical field of approximately 5000 V/cm was applied to the crystal throughout the entire heating and cooling cycle. As stated above, the silver paint was used to provide electrical conductivity, to ensure a good Ohmic contact with the crystal surface. Similar results may be achieved with deposited metal layers, but the silver paint works well and is easy and cheap to apply. A further advantage of the electrical treatment approach over the HIP process is that the electrical treatment may be accomplished at low temperatures, e.g. at or below room temperature, depending on the materials. This offers the chance of electrically treating materials without possible damage to existing complex internal structures. A good example of this would be the conversion of Cr:ZnSe waveguide devices, where the waveguide has been previously written using fast laser inscription. It was discovered that HIP treatment erases such waveguides, but the electrical treatment preserves such structures.

Note that the results in FIGS. 2A-2B and FIG. 3 represent the results of preliminary experiments. Further experiments are planned to identify optimum operating conditions and to test a number of potential additional opportunities.

Effects of Field and Current

It is believed that the electric field is important to provide the electro-motive force which may be responsible for defect migration within the crystal. In addition, higher field strengths and/or higher temperatures may assist in improving or enhancing the speed and quality of the finished product. Further, the underlying physical mechanism may be related to the total amount of charge that is transmitted through the sample, which renders the current more important than the electric field. Since the current flow is directly related to the applied voltage (directly proportional if the sample behaves Ohmically, non-proportional if the sample is non-Ohmic), it is impossible to change one parameter without also affecting the other.

Figure 4:
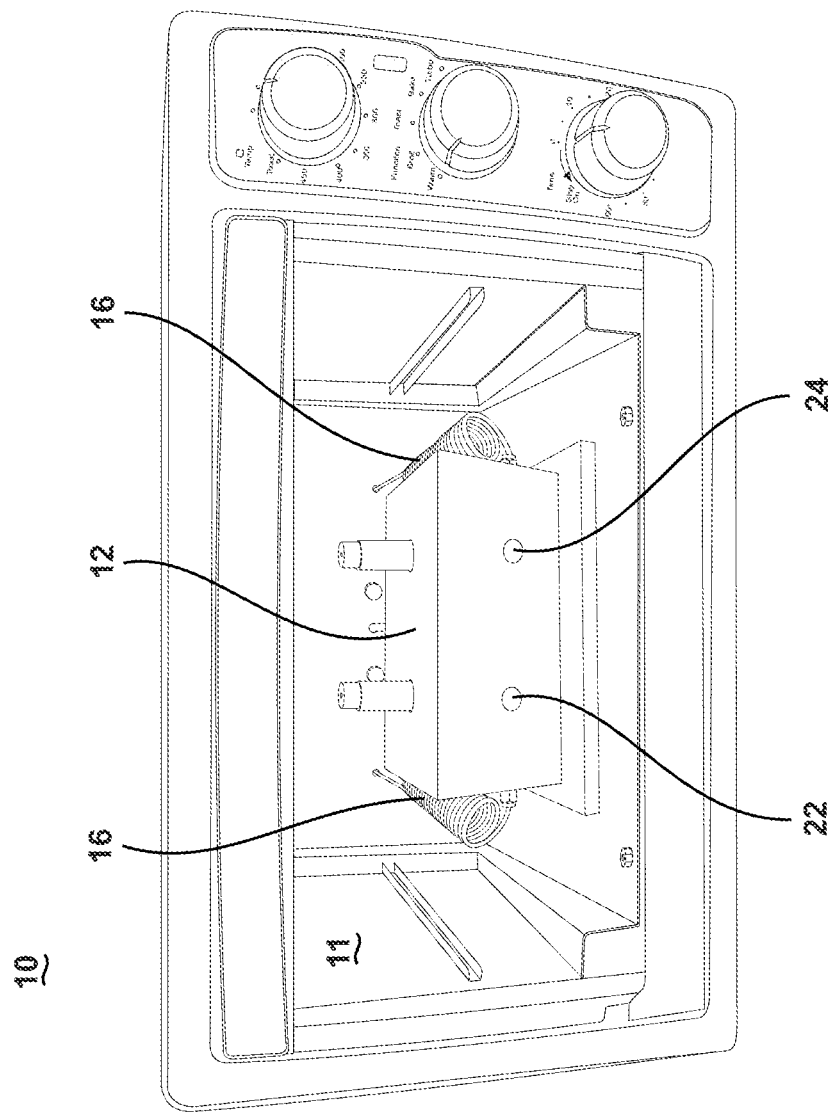
FIG. 4 illustrates a furnace for heating electrically-treated crystals, according to an embodiment of the invention.

FIG. 4 illustrates a front view of a furnace 10 for heating electrically-treated crystals. According to an embodiment of the invention, the chamber 11 of the furnace 10 includes an electrical support structure 12 having a number of features suitable for supporting the heating of electrically-processed samples, as explained in more detail below.

Figure 5:
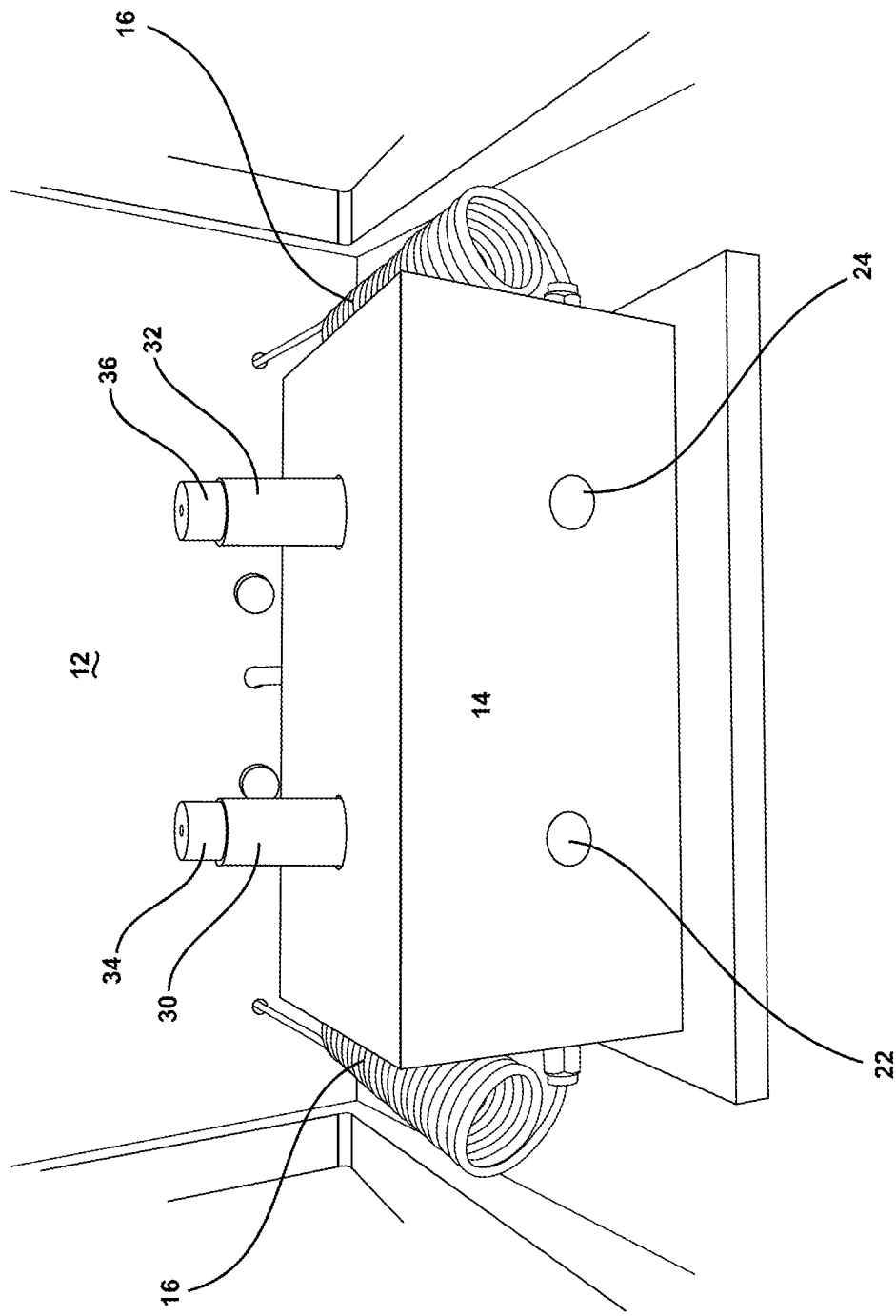
FIG. 5 illustrates an electrode support structure for the simultaneous treatment of two separate samples in the furnace for heating electrically-treated crystals of FIG. 4, according to an embodiment of the invention.

FIG. 5 illustrates an electrical support structure 12 for the simultaneous treatment of two separate samples in the furnace 10 for heating electrically-treated crystals of FIG. 4. As illustrated in FIG. 5, the electrical support structure 12 may comprise a large thermal mass 14 of a suitable electrically-conducting metal (e.g. aluminum, copper, brass, stainless steel, or graphite), coiled heat exchanger tubes 16 for feeding gas to the individual crystal electrode areas 18, 20 to enable the feed gas to be admitted to the crystal areas at the same temperature as the chamber 11 inside the furnace 10, two viewing ports 22, 24 to permit visual, camera recorded, or spectroscopic observations, two electrode support ports 26, 28 containing an electrically insulating shroud 30, 32 surrounding a central electrode 34, 36. The two electrodes 34, 36 may be made from a suitable conductive medium, e.g. aluminum, copper, brass, stainless steel, graphite, etc . . . .

Figure 6:
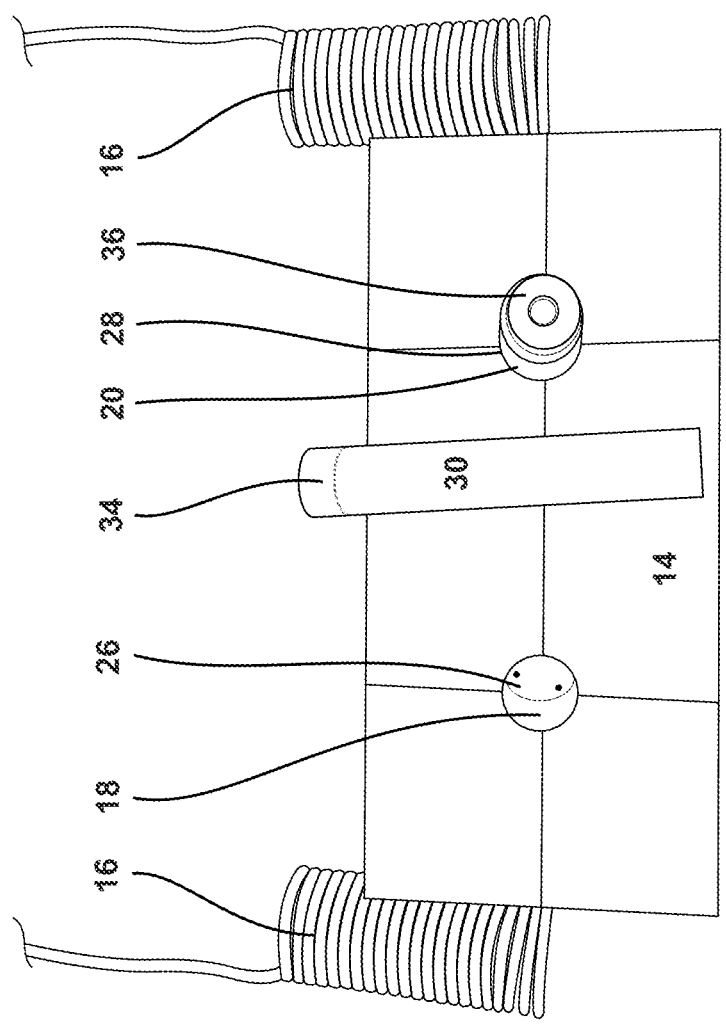
FIG. 6 illustrates a top view of the electrode support structure of the furnace for heating electrically-treated crystals of FIG. 4, with one of the electrodes removed and laid onto the top face of the thermal mass block, according to an embodiment of the invention.

FIG. 6 illustrates a top view of the electrode support structure 14, shown with one of the electrodes 34 removed and laid onto the top face of the thermal mass block 14. The two coiled copper heat exchangers 16 for the gas feeds are shown coupled to the left and right of the thermal mass block 14.

Figure 7:
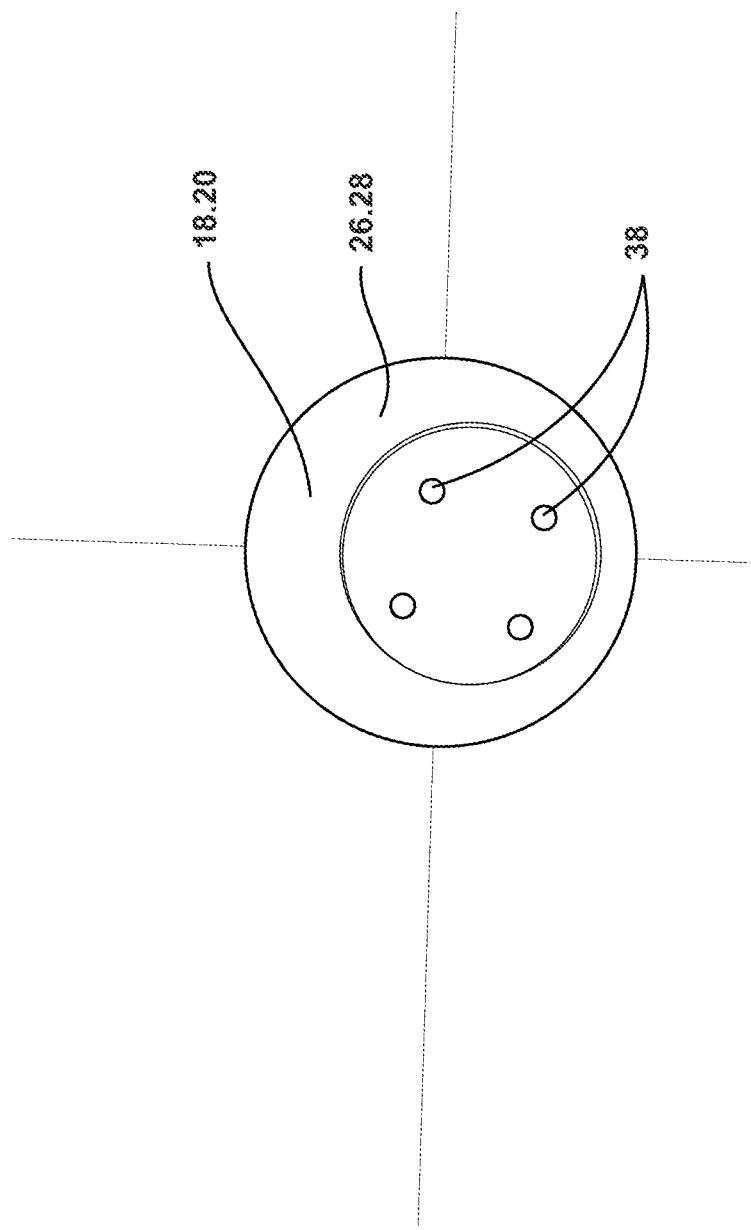
FIG. 7 illustrates an electrode area of the thermal mass block of the furnace of FIG. 4, with the electrode and insulating shroud removed, according to an embodiment of the invention.

FIG. 7 illustrates a view into an empty electrode area 18, 20 with the electrode 34, 36 and insulating shroud removed 30, 32. At the base of the electrode area 18, 20 is illustrated a number of small holes 38 which are used to feed the desired gas from the coiled heat exchangers 16 into the electrode surround 26, 28 of the thermal mass block 14.

Figure 8:
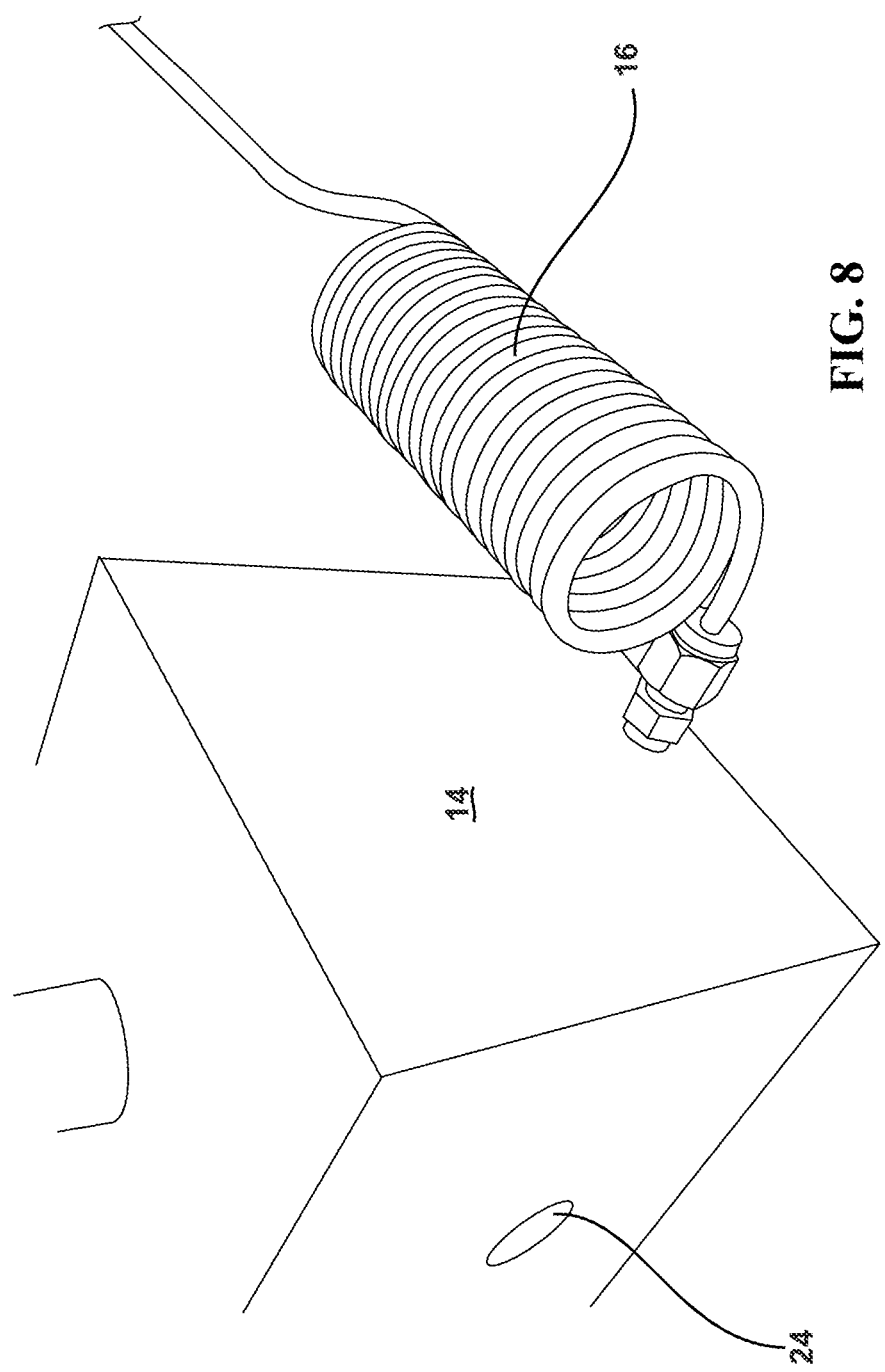
FIG. 8 illustrates a close-up of the coiled heat exchangers for the furnace of FIG. 4, according to an embodiment of the invention.

FIG. 8 illustrates a close-up of the coiled copper heat exchangers 16, as described above. The coiled tubes 16, e.g. copper, provide a long physical path for the gas supply delivered to the thermal mass block 14, to become warmed by the furnace environment inside the chamber 11 to reach approximately the same temperature as the rest of the assembly, i.e. the thermal mass block 14 and electrodes 34, 36. The coiled tubes 16 are coupled to a port in the thermal mass block 14, and gas is delivered through an orifice in the thermal mass block 16 to the small holes 38 (see FIG. 7) in the base of each of the electrode areas 18, 20. Accordingly, the coiled tubes 16 serve to prevent thermal shock to the electrically-processed material (not shown) and ensures that the sample remains at the furnace's desired operating temperature.

Accordingly, a third variable is introduced in order to separate the contributions made to the process by the electric field and by the electric current. The third variable involves leveraging the photoconductivity of the sample by exposing it to a bright light source during the electrical modification. An externally-applied light source increases the photoconductivity, adding a significant current flow without changing the external field, as long as the drawn current does not exceed the current limit of the power supply.

Ideally, the maximum possible amount of light should be used. The maximum possible amount of light is that amount which causes heating of the sample to the desired operating temperature. An "optical furnace" 90 (FIGS. 9A-11) may be used, where powerful, focused light, e.g. and LED light (see FIGS. 12-14), is used to directly heat the crystal through linear optical absorption. A simple feedback loop and thermocouple/PID controller may be used to achieve a stable temperature set point and thermal ramp-rate by controlling the current supplied to the LED elements. The controller is provided with an input from a thermocouple and it then the controller adjusts the power to the furnace to obtain the desired temperature. The device is at least somewhat automated; the user defines temperature set points and how quickly the furnace should reach those points. By using different color LEDs, any additional effects from operating above or below the material bandgap can be determined.

Figure 9B:
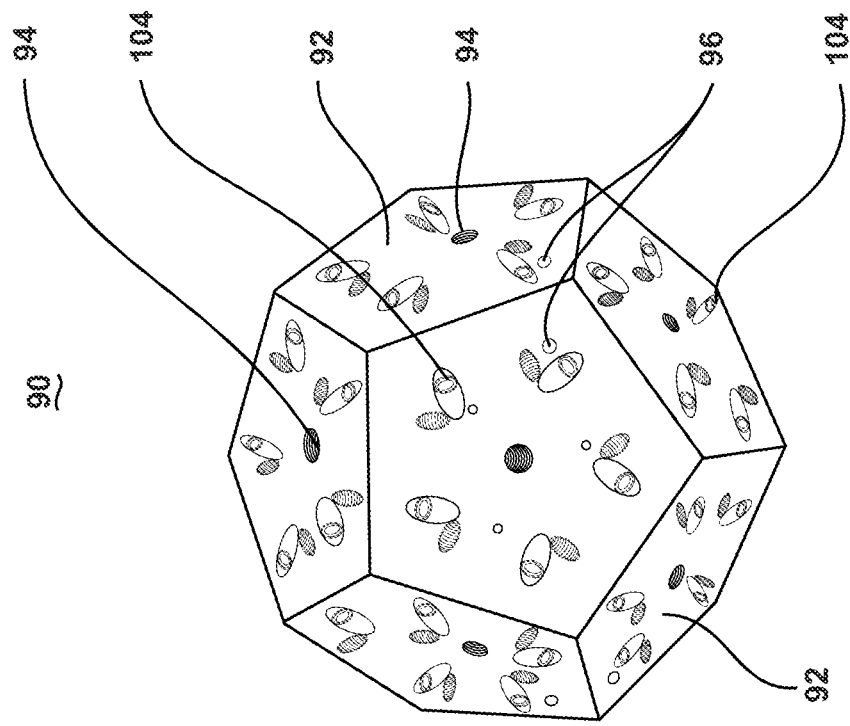
FIGS. 9A-9B illustrate a partial optical furnace and an assembled optical furnace for heating electrically-treated crystals, according to an embodiment of the invention.
Figure 9A:
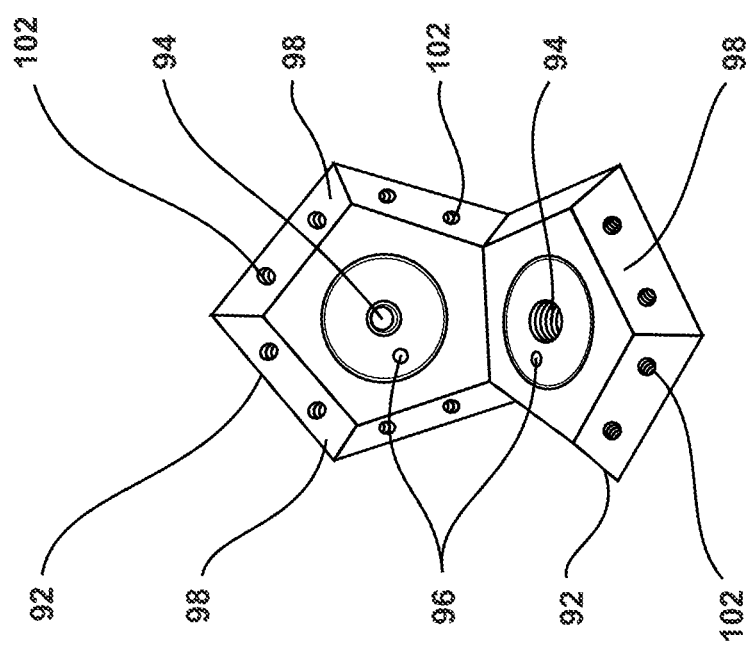
Figure 13:
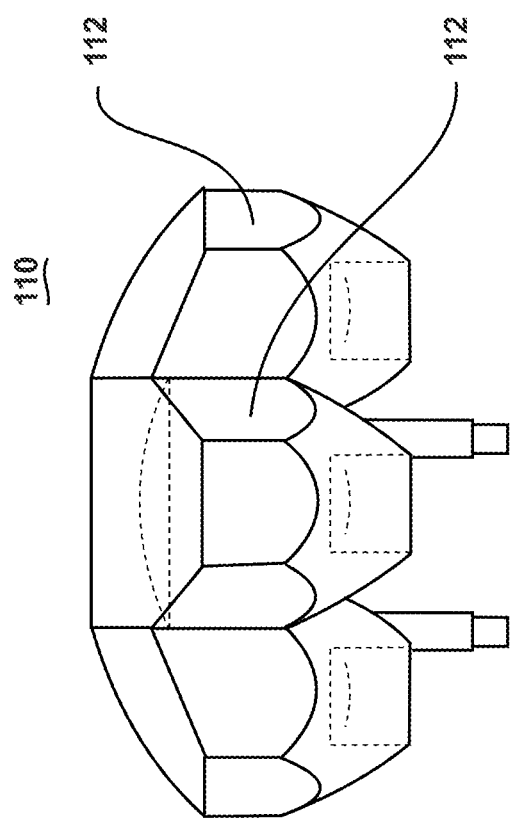
FIG. 13 illustrates a side view of a light unit for an optical furnace for electrically-treated crystals of FIGS. 9A-11, according to an embodiment of the invention.
Figure 14:
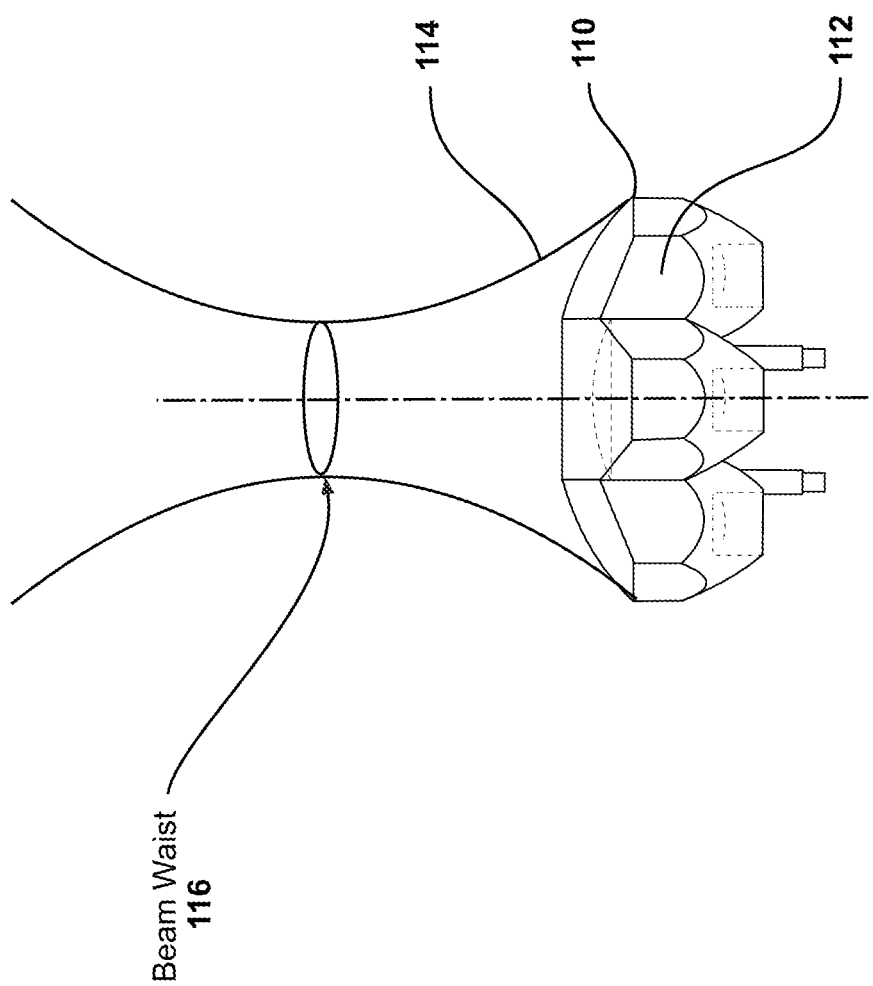
FIG. 14 illustrates the light intensity emission characteristics of a light unit for an optical furnace for heating electrically-treated crystals of FIGS. 9A-11, according to an embodiment of the invention.

FIG. 9A illustrates facets 92 of an optical furnace 90, and FIG. 9B illustrates an optical furnace 90 made of multiple facets 92, where each facet of a polyhedral, e.g. dodecahedron, structure may be a water cooled cluster of 7 powerful LEDs (see FIGS. 12-14) with a combined imaging lens 110 to focus the LED light at a point in space above the LED cluster (see FIG. 14). The optical furnace 90 is designed to collectively focus the light from each light to a common central spot, where a crystal is mounted, creating a concentration of light contained within a small volume, e.g. 1 $cm^3$. The wattage of the illumination to be applied is easily controllable, depending upon the types of light sources used. It may be desirable to use a much more powerful optical source, e.g. arc lamp, lasers, high pressure mercury or sodium, etc., to applied 70 W, 200 W or more to the sample inside the furnace. The amount of light required for treating a sample, e.g. a crystal, should be chosen according to the thermal and optical properties of the sample being treated.

With regard to FIGS. 9A-9B, two facets 92 of an optical furnace 90 are presented. Each facet includes a mounting aperture 94 for a light assembly 110, a port 96 for electrical power and water cooling, and edge surfaces 98 which mate with adjoining facets 92 to form an enclosure 100 for light and crystals. The facets 92 are connected to each other at their edges 98, which may be according to known methods, i.e. adhesives, screws, or other means, to form the enclosure 100. When screws 104 are used, the facets 92 may be formed with complementary threaded apertures 102 in the edges 98 which, when the facets 92 are in a particular orientation with respect to each other, align to permit a threaded fastener 104, e.g. a screw, to be inserted therethrough and thereby fix each facet 92 to adjacent facets.

Figure 10:
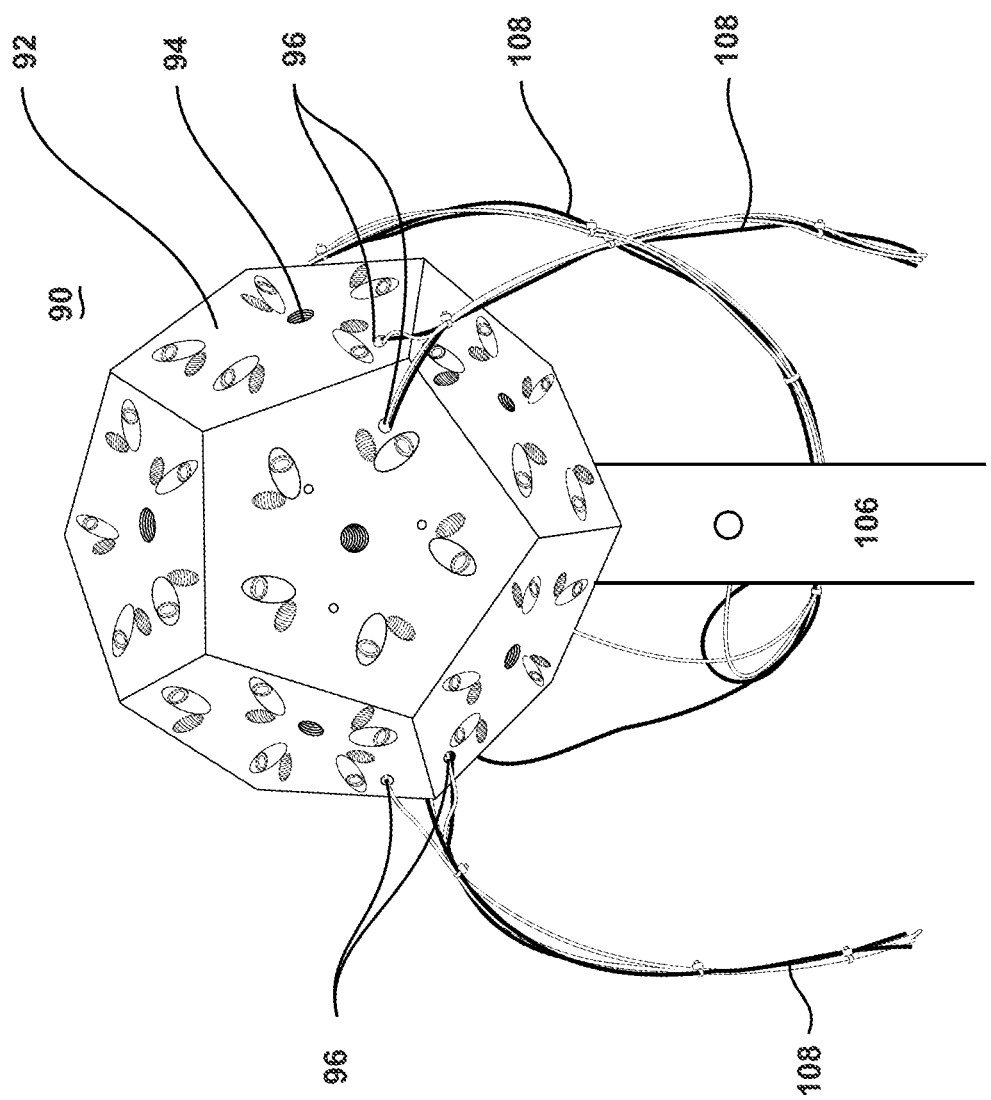
FIG. 10 illustrates an assembled optical furnace with electrical power lines, according to an embodiment of the invention.

FIG. 10 illustrates an optical furnace 90 mounted on a support rod 106, and with a plurality of power lines 108 through ports 96 for powering the light assemblies 110 in the enclosure 100.

Figure 11:
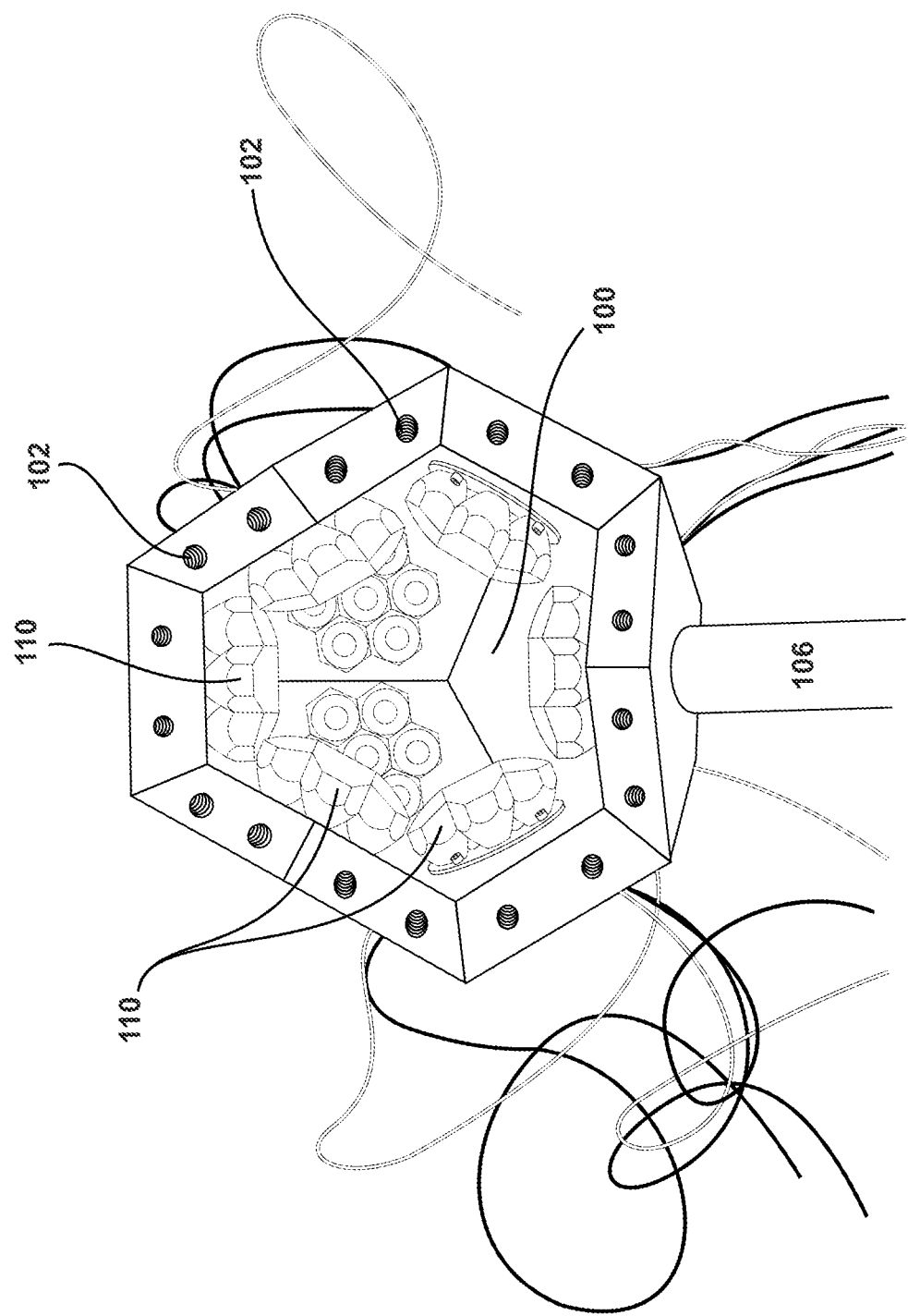
FIG. 11 illustrates an opened optical furnace for electrically treated crystals, according to an embodiment of the invention.

FIG. 11 illustrates an optical furnace 90 which has had several facets 92 removed to present the arrangement of the enclosure 100. When the optical furnace is fully assembled, the enclosure 100 contains a plurality of light assemblies 110. There may be one or more light assemblies 110 per facet 92 to provide maximum light power for the crystal mounted in the enclosure 100.

Figure 12:
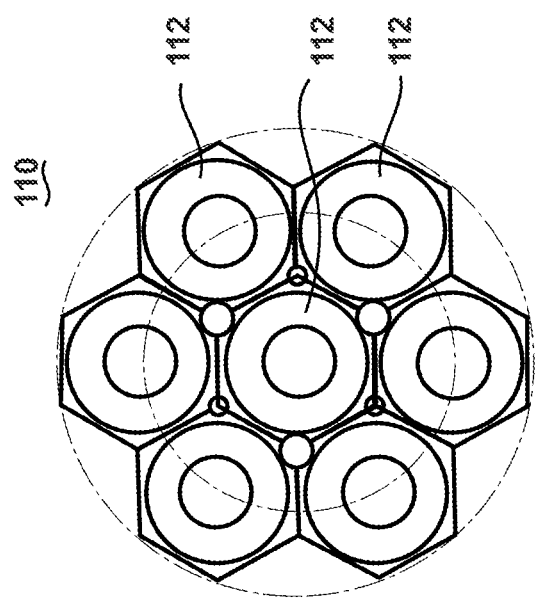
FIG. 12 illustrates a top view of a light unit for an optical furnace for electrically-treated crystals of FIGS. 9A-11, according to an embodiment of the invention.

FIGS. 12-13 illustrate top and side views, respectively, of a light assembly 110, which may be comprise a plurality of individual light elements or LEDs 112. The light elements 112 may be arranged to cooperate in producing a beam 114 (see FIG. 14) that is powerful and focused 116 enough to enable electrical processing to the crystal in the enclosure 110. FIG. 12 illustrates an arrangement of seven light elements 112 formed into a single light assembly 110 which may be attached to the mounting apertures 94 of the facets 92.

FIG. 14 illustrates a side view of a light assembly 110 with a light beam 114 being emitted therefrom. The beam 114 is focused to a narrow waist 116 at a defined distance from the light assembly 110, depending on the size of the optical furnace 92, the size of the enclosure 100, and the size of the crystal mounted therein.

Electrical Doping

As explained above, the premise for this invention is that an externally-applied electric field is able to move charge-related defects through the bulk material. Any deliberately added atomically-bound dopant, such as Cr atoms, can only exist in ionic form within the crystal. As such, it seems likely that the same applied electric field may be capable of introducing dopant species into an otherwise undoped bulk crystal. This may be accomplished either by using electrodes fabricated form the desired dopant (i.e. Cr or Fe electrodes), or by pre-coating the faces of the crystal with the appropriate desired dopant, and then applying the external electric field.

In laboratory testing, using the application of an electric field, the electrode material was migrated into the crystal, and the crystal color came out green, rather than the expected orange, and the crystal was highly photoconductive. The color indicates the possibility of chromium in the Cr 4+ ionic state or interstitial Cr sites within the ZnSe lattice.

Other Materials

The process of electrically treating Cr:ZnSe materials has been demonstrated, but the same procedure is suitable for treating a wide variety of other materials. Materials suitable for HIP treatment are also suitable for use with this invention. The low temperature of the present electrical conversion process makes this process most suitable for covalently-bonded materials, where the chemical bond strength is relatively weak, but we do not exclude the possibility that the process may also work with ionic materials.

THz Generation

During the initial tests to ascertain the efficacy of the electrical treatment method as a means to intentionally dope Cr ions into an undoped polycrystalline sample of ZnSe, we noted the development of strong photoconductivity. Undoped ZnSe is known to be photoconductive, but the field strengths and optical intensities are usually both required to be very high. However, we observed strong photoconductivity at relatively low fields (~5 kV/cm) and with low level illumination (simple lab flashlight). Using a stronger light source (~100 mW CW green laser) we were able to increase the current flow sufficiently to generate electrical breakdown in our sample (current peaked to several mA). The high photoconductivity makes our electrically-processed materials potentially useful as THz generators, using photoconductivity to radiate in the THz region of the electromagnetic spectrum.

The method described above provides the ability to create homogeneously-broadened laser materials which may be characterized by a laser linewidth that is naturally narrowed without sacrificing efficiency or tunability. The invention provides the means for converting commercially-sourced inhomogeneously-broadened materials, and/or for simultaneously doping or alloying laser materials or for producing scintillator materials.

The process provides distinct advantages, including more-efficient and cheaper narrow linewidth lasers which may be used for a wide variety of applications, e.g. scintillator materials, photoconductors, LIDAR, spectroscopy, IRCM, remote sensing, medical applications, and materials processing. The disclosed method provides distinct advantages, including lower costs, particularly when compared to the HIP process, and the method yields a direct electrical signature to determine when the process has been completed. The direct electrical signature is the change from nonlinear to linear (Ohmic) current flow with an applied voltage, as illustrated in FIG. 3.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of treating a substrate, comprising:
   (a) applying an electric field to a substrate comprising a layer of a dopant on at least one surface;
   (b) applying a predetermined temperature to the substrate in the electric field;
   (c) applying the electric field and the predetermined temperature for a time sufficient to induce migration of the dopant into the substrate to provide a doped substrate; and
   (d) removing the electric field and returning the doped substrate to about room temperature, wherein the doped substrate is characterized in that a spectral laser output of the doped substrate exhibits a nominally single frequency having a linewidth less than about 5 nm, wherein the layer of a dopant comprises one or more segregated layers of distinct chemical species, a plurality of blended dopant materials, or a plurality of dopant materials as a eutectic.

2. The method of claim 1, wherein the substrate is a glass material, a single crystal material, a poly-crystalline material, a ceramic material, or a semiconductor material.

3. The method of claim 1, wherein before treatment the substrate comprises one of an undoped substrate and a doped substrate.

4. The method of claim 1, wherein the substrate is optically transparent.

5. The method of claim 1, wherein the dopant comprises one or more transition metals, one or more rare earth elements, or a combination of both.

6. The method of claim 5, wherein the metallic dopant is an atomic or ionic species of an element selected from the group consisting of silver, gold, cobalt, chromium, copper, iridium, iron, manganese, molybdenum, niobium, nickel, palladium, platinum, rhenium, rhodium, ruthenium, tantalum, hafnium, osmium, titanium, vanadium, tungsten, zirconium, scandium, yttrium, lanthanum, cerium, praseodymium, neodymium, samarium, europium, gadolinium, terbium, dysprosium, holmium, erbium, thulium, ytterbium, lutetium, or combinations thereof.

7. The method of claim 1, wherein the substrate is selected from the group consisting of Zinc selenide (ZnSe), Zinc Sulphide (ZnS), Yttrium Aluminum Garnet (YAG), Yttrium Lithium Fluoride (YLF), Yttrium orthovanadate (Nd:$YVO_4$), Neodymium doped yttrium calcium oxoborate Nd:$YCa_4O(BO_3)_3$, silicate glass, phosphate glass, sapphire, lithium strontium (or calcium) aluminum fluoride (Ce:LiSAF, Ce:LiCAF), chrysoberyl (alexandrite), calcium fluoride ($CaF_2$), Gallium Nitride (GaN), Gallium Phosphide (GaP), Indium Gallium Nitride (InGaN), Aluminum Gallium Indium Nitride (InGaInP), Aluminum Gallium Arsenide Phosphide (InGaAsP), Lithium niobate ($LiNbO_3$), Potassium Niobate ($KNbO_3$), Strontium Barium Niobate (SBN), Yttrium Scandium Gallium Garnet (YSGG), Yttrium Vanadate ($YVO_4$), Terbium Gallium Garnet ($Tb_3Ga_5O_{12}$), Potassium Gadolinium Tungstate (KGW), Forsterite ($Mg_2SiO_4$), Barium Yttrium Fluoride ($BaY_2F_5$), Barium Yttrium Lutetium Fluoride ($BaYLuF_5$), and combinations thereof.

8. The method of claim 1, wherein the predetermined temperature is between about −30° C. to about 1000° C.

9. The method of claim 1, wherein the applied electric field degree is between about 100 V/cm to about 10 kV/cm.

10. The method of claim 1, wherein the time sufficient to induce migration of the dopant into the substrate is between about 1 hour to about 1,000 hours.

11. The method of claim 1, wherein the substrate is ZnSe or ZnS, and wherein the dopant is chromium or iron.

12. The method of claim 1, wherein a thickness of the layer of dopant is within a range from about 60 Å to about 60,000 Å.

13. The method of claim 1, wherein the electric field and temperature are applied in an inert atmosphere.

14. The method of claim 1, wherein heating the substrate and applying the degree of isostatic external pressure is performed in an atmosphere comprising Argon, Nitrogen, Oxygen, Carbon Dioxide, Neon, Helium, Hydrogen, or combinations thereof.

15. The method of claim 1, wherein the dopant comprises a non-metallic element or compound.

16. The method of claim 15, wherein the substrate is selected from the group consisting of Zinc Selenide, Zinc Sulfide, Zinc Telluride, Cadmium selenide, Cadmium sulfide, Cadmium Telluride, or Mercury Cadmium Telluride; and the dopant is Sulfur, Tellurium, or a combination of both.

17. A method of treating a substrate, comprising:
(a) applying an electric field to a substrate comprising a layer of a dopant on at least one surface;
(b) applying a predetermined temperature to the substrate in the electric field;
(c) applying the electric field and the predetermined temperature for a time sufficient to induce migration of the dopant into the substrate to provide a doped substrate; and
(d) removing the electric field and returning the doped substrate to about room temperature, wherein the doped substrate is characterized in that a spectral laser output of the doped substrate exhibits a nominally single frequency having a linewidth less than about 5 nm, wherein the substrate is ZnSe or ZnS, and wherein the dopant is chromium or iron.

18. A method of treating a substrate, comprising:
(a) applying an electric field to a substrate comprising a layer of a dopant on at least one surface;
(b) applying a predetermined temperature to the substrate in the electric field;
(c) applying the electric field and the predetermined temperature for a time sufficient to induce migration of the dopant into the substrate to provide a doped substrate; and
(d) removing the electric field and returning the doped substrate to about room temperature, wherein the doped substrate is characterized in that a spectral laser output of the doped substrate exhibits a nominally single frequency having a linewidth less than about 5 nm, wherein heating the substrate and applying the degree of isostatic external pressure is performed in an atmosphere comprising Argon, Nitrogen, Oxygen, Carbon Dioxide, Neon, Helium, Hydrogen, or combinations thereof.

19. A method of treating a substrate, comprising:
(a) applying an electric field to a substrate comprising a layer of a dopant on at least one surface;
(b) applying a predetermined temperature to the substrate in the electric field;
(c) applying the electric field and the predetermined temperature for a time sufficient to induce migration of the dopant into the substrate to provide a doped substrate; and
(d) removing the electric field and returning the doped substrate to about room temperature, wherein the doped substrate is characterized in that a spectral laser output of the doped substrate exhibits a nominally single frequency having a linewidth less than about 5 nm, wherein the dopant comprises a non-metallic element or compound.

20. The method of claim 19, wherein the substrate is selected from the group consisting of Zinc Selenide, Zinc Sulfide, Zinc Telluride, Cadmium selenide, Cadmium sulfide, Cadmium Telluride, or Mercury Cadmium Telluride; and the dopant is Sulfur, Tellurium, or a combination of both.

* * * * *